| United States Patent [19] | [11] Patent Number: 5,039,649 |
| Lippert et al. | [45] Date of Patent: Aug. 13, 1991 |

[54] ANHYDROUS SOLID RANEY-CATALYST DISPERSION AND A PROCESS FOR ITS PREPARATION

[75] Inventors: Gerhard Lippert, Kleinostheim; Rolf Hartung, Neuberg, both of Fed. Rep. of Germany

[73] Assignee: Degussa Aktiengesellschaft, Frankfurt am Main, Fed. Rep. of Germany

[21] Appl. No.: 347,241

[22] Filed: May 4, 1989

[30] Foreign Application Priority Data

May 4, 1988 [DE] Fed. Rep. of Germany ....... 3815110

[51] Int. Cl.$^5$ .............................................. B01J 25/00
[52] U.S. Cl. .................................................... 502/301
[58] Field of Search ......................................... 502/301

[56] References Cited

U.S. PATENT DOCUMENTS

| 2,865,865 | 12/1958 | Ockrent et al. | 502/301 X |
| 3,560,404 | 2/1971 | Jung et al. | 502/301 X |
| 4,176,092 | 11/1979 | Birkenstock et al. | 502/301 X |
| 4,794,098 | 12/1988 | Pohl et al. | 502/301 X |

FOREIGN PATENT DOCUMENTS 2724239  11/1978  Fed. Rep. of Germany.

*Primary Examiner*—W. J. Shine
*Attorney, Agent, or Firm*—Beveridge, DeGrandi Weilacher

[57] ABSTRACT

Anhydrous, solid Raney catalysts in fusible, organic embedding media prepared by initially introducing a Raney catalyst slurry into a vacuum mixer under an inert gas atmosphere, admixing the embedding medium, removing the main quantity of the water at temperatures below the melting point of the embedding medium and removing the residual water above the melting point of the embedding medium in vacuum while maintaining mixing. After the dehydration, the vacuum is terminated by applying an inert gas and the product where called for is shaped into low-surface molded bodies.

11 Claims, No Drawings

ANHYDROUS SOLID RANEY-CATALYST DISPERSION AND A PROCESS FOR ITS PREPARATION

The invention relates to an anhydrous solid Raney-catalyst dispersion in an organic embedding medium, which is non-pyrophoric, storage- and shipping-stable and which furthermore is easily apportioned or dosed in hydrogenation applications.

The apportioning or dosage is desirable because the conventional water-protected Raney catalysts present gave difficulties in that respect. Prior to application, the water standing above the nickel first must be decanted and the residual catalytic slurry can scarcely be divided into accurately measured nickel portions in the absence of costly homogenization.

Raney-catalysts as a rule incur the drawback of fire hazards at the moment the typically added protective means, i.e. water, has been removed. Another disadvantage is that the catalyst wetted with water cannot easily be introduced into hydrophobic substrates to be hydrogenated. Besides there is the above-mentioned problem of apportioning or dosing. The German patent 27 24 239 attempts to overcome this shortcoming by mixing a hydrogenation-active Raney-catalyst in the form of an aqueous slurry with a primary, secondary or tertiary amine of 8 to 22 carbons, with a diamine, with a cyclic amine or with a solid mixture of amines containing one or more of these amine compounds as the embedding medium. While the patent does state that the residual amount of water in the catalyst may be minute, this result manifestly is achieved however only at the cost of introducing foreign additives such as fuller's earth to the system. Short of such additives, part of the initially introduced water always remains in the mixture which is stated to be pasty, and it may interfere when the product is used for hydrogenation of special compounds. Accordingly, the above-mentioned patent does not disclose process steps whereby a product can be obtained which contains no free or adsorbed water.

Accordingly, it is the object of the invention to develop a practically anhydrous hydrogenation catalyst, that is, one containing less than 1% by weight of water, whereby the above difficulties can be eliminated. The new catalyst can be employed both in water-sensitive and water-insensitive systems of reaction.

Accordingly, the object of the invention is an anhydrous, solid Raney-catalyst dispersion in an organic embedding medium consisting of a primary, secondary or tertiary amine with 8 to 22 carbons, of a diamine or a cyclic amine or a solid mixture of amines containing one or more of these amine compounds, which is prepared by mixing the embedding medium with a Raney-catalyst in the form of an aqueous slurry.

The invention is characterized in that the catalyst slurry is first introduced into a vacuum mixer in an inert-gas atmosphere, in such case the fusible organic embedding medium is added in molten or unmolten form while mixing in that 80 to 90% by weight of the water introduced with the catalyst slurry into the vacuum mixer is removed from the inhomogeneous ternary system of catalyst/ water/embedding-medium at temperatures below the melting point of the embedding medium and in vacuum, and in that the residual water is removed in vacuum above the melting point of the embedding medium, preferably at less than 100° C., while mixing continues, and in that the dispersion, following ending the vacuum with inert gas, if need be, is shaped into molded bodies of low surface area which are filled into packing drums.

The embedding medium can also contain a $C_{16}$–$C_{22}$ aliphatic alcohol or a solid mixture of various fatty alcohols containing those alcohols, a solid triglyceride, a paraffin wax, a natural or synthetic wax, a silicone resin or an organic polymer, the weight ratio of catalyst-solid to embedding-medium being from 20 to 80% by weight to 80 to 20% by weight.

The dispersions of the invention customarily show contents of residual water of about 0.3% by weight as determined by the Karl-Fischer method.

The Raney-catalyst dispersion of the invention may contain 50–70%, preferably 55–65% by weight of Raney catalyst and 50–30%, preferably 45–35% by weight of embedding medium. Applicable Raney catalysts are Raney nickel, Raney cobalt, Raney copper, Raney iron or a nickel-, cobalt-, copper- or iron-Raney-catalyst doped with base or precious metals. Doping can be carried out with such base metals as molybdenum, chromium, zirconium, nickel, iron and copper, and with such precious metals as silver, the metals of the platinum group, in particular palladium and platinum.

The embedding media are fusible, organic compounds with a room temperature consistency suitable to totally enclose the particles of the Raney-catalyst. Such media are a $C_{16}$–$C_{22}$ aliphatic alcohol or a solid mixture of various fatty alcohols containing those alcohols, a primary, secondary or tertiary amine with 8–22 carbons, a diamine or cyclic amine or a solid mixture of amines containing one or more of these amine compounds, a solid triglyceride, a paraffin wax, a natural or synlhetic wax. The embedding media denoted as "solid" are not "hard" ones, rather it is meant that the embedding medium is not fluid at room temperature, that is, it does not possess the consistency of a liquid paste. However, it may be deformable like wax (ductile) when pressure is applied to it. To this extent the dispersions of the invention are not "pastes". Besides the catalytic substance and the embedding medium, the dispersions contain no foreign substances such as dispersants, filter aids or adsorbents.

By the use of such embedding media, a catalyst dispersion is obtained which presents no fire danger, possesses high hydrogenation activity and can be easily divided into optional portions. The catalyst can be used unrestrictedly several times in sequence for hydrogenation without appreciable losses in activity being incurred. It is suited for the advantageous replacement of supported catalysts for instance of the $Ni/SiO_2$— carrier type; this may be highly advantageous in hydrogenation installations where the catalyst must be pumped on account of the elimination of abrasion.

All the amines included among the embedding media contain at least one saturated or unsaturated, straight or branched carbon chain with 8 to 22 carbon atoms and are primary, secondary or tertiary amines and diamines. For example, they may be derived from ethylenediamine or propylenediamine, a $C_8$–$C_{22}$ chain pendant at least from one N-atom, or cyclic amines, that is amines with at least one N atom in a heterocyclic ring where at least one $C_8$–$C_{22}$ chain is connected to one N atom or one C ring atom, (an example is imidazoline with $C_8$–$C_{22}$ carbon-chain in its 2-position).

The amines or diamines may be prepared synthetically. However, they may also be obtained at least in part from natural products such as animal tallow, rape seed oil, coconut oil, soy oil and fish-oil. Mixtures of these amines also are eminently suitable.

Besides the stated embedding media, further substances may be present which correspond to the end product of a hydrogenation.

Contrary to the German patent 27 24 239 wherein the described Raney catalyst always will retain substantial quantities of free or adsorbed water, there is no danger in the products obtained by the process of the invention that metal drums filled with such products, for instance, iron drums, would corrode. An additional advantage is that hydrolyzable substrates can be hydrogenated without decomposition.

A Raney-catalyst dispersion consisting of 50–70, preferably 60% by weight of Raney nickel and of 50–30, preferably 40% by weight of paraffin wax, distearylamine or tallow fatty alcohol of 16 to 18 carbon atoms, was found especially advantageous with regard to the preparation, application and activity of the catalyst.

Another essential object of the invention is a process for preparing the catalyst dispersions of the invention which includes the mixing, in a known manner, of a Raney catalyst in the form of an aqueous slurry with the embedding medium. This process is characterized by initially introducing the catalyst slurry in a vacuum mixer under an inert gas atmosphere, by adding, while mixing, the fusible organic embedding medium, if need be, in the molten state, and thereupon, in case this embedding medium still were molten, to cool it below its solidification point. This is followed by removing 80 to 90% by weight of the water introduced with the catalyst slurry into the vacuum mixer from the inhomogeneous ternary system of catalyst/water/embedding-medium at temperatures below the melting point of the embedding medium and the residual water above the melting point of the embedding medium, preferably below 100° C., in vacuum, while proceeding with mixing, and upon ending the vacuum by means of inert gas, shaping the dispersion into molded bodies of low surface area, in particular into pellets, by transferring the still liquid catalyst dispersion onto a cooled pelletizing apparatus and filling it into drums.

It is essential therein that the separation of the main quantity of water from the aqueous Raney catalyst slurry (which is obtained by decanting and/or removing water from a conventional water-protected Raney catalyst having a water content of 20 to 40% by weight) take place previously in the inhomogeneous ternary system of catalyst/water/embedding-medium and that the residual water be separated from the melt.

As a rule, in the process of the invention, about 80–90% by weight of the water introduced with the catalyst slurry into the vacuum mixer is removed in the first dehydration stage and the remainder in the second. The usually sufficient degree of dehydration of the end product ($\sim$0.99% by weight of $H_2O$) is achieved for instance when reaching a partial vacuum of 50 mbars in the case of dehydrating a mixture of Raney-catalyst and distearylamine of 80° C. in the second stage. Higher degrees of dehydration are possible at moderately higher temperatures, when using a powerful high-vacuum system and upon correspondingly extending the time of residual dehydration. However, dehydration rates as low as 0.2% by weight of water are achieved in short times and without difficulties when employing water ring pumps (final vacuum about 20 mbars).

Using a batch of 225 kg of catalyst slurry (150 kg of catalyst) and 100 kg of distearylamine, the duration of the first dehydration stage is 1.5 hours and that of the second is 0.5 hour.

The invention is illustrated below in relation to several examples of implementation of the preparation of the water-free, solid Raney-catalyst dispersion in a fusible, organic embedding medium.

EXAMPLE 1

100 kg of Raney-nickel consisting of 60 kg nickel and 40 kg supernatant water are filled into a vacuum planetary mixer previously flushed with nitrogen. Following evacuation of the supernatant water by means of a probe inserted from above into the mixer, 40 kg of molten tallow $C_{16}$–$C_{18}$ fatty alcohol (HYDRENOL from Henkel Co.) at 80° C. are added to the remaining catalyst slurry containing 30% by weight water.

The nickel and fatty alcohol are mixed into a friable mass permeated with about 30% by weight of water. After the vacuum has been applied to the mixer, the temperature is raised to below the melting point of the fatty alcohol (about 50° C.) and the main quantity of the contained water (about 90% by weight) is distilled off. Thereupon the temperature is raised above the melting point of the fatty alcohol and further mixing takes place in vacuum. The nickel particles are uniformly embedded in the molten fatty alcohol.

The residual water is then distilled off above the melting point of the fatty alcohol. Upon reaching 80° C. at a partial vacuum of about 50 mbars, the mixer is made inert with nitrogen and the fluid mass is formed into pellets (8–10 mm) on a cooling belt. The practically water-free product (0.2% by weight water content) is packed in drums.

A test of the hydrogenation activity carried out on a tallow fatty alcohol having an average chain distribution of 5% $C_{14}$, 30% $C_{16}$ and 65% $C_{18}$ (molecular weight 260, hydroxyl number 215) shows correspondence to that of the water-protected initial catalyst. The hydrogenation test is described in Example 7.

EXAMPLE 2

The procedure is the same as in Example 1, except for adding 40 kg of molten hard paraffin ($C_{18}$). After the main quantity of water is distilled and the melting point (56° C.) of the paraffin has been exceeded, a homogeneous mixture is obtained in the manner of Example 1. This mixture is pelletized on a cooling belt. The finished product contains about 0.3% by weight water.

The hydrogenation activity relative to a tallow fatty acid nitrile of the molecular weight 257 and the iodine number 55 with the branching distribution stated in detail in the manufacturer's brochure and listed below remained unchanged relative to the aqueous initial catalyst material:

| | | |
|---|---|---|
| $C_{13}$ | 3% | saturated |
| $C_{14}$ | 1% | unsaturated |
| $C_{15}$ | 2.6% | saturated; 2% unsaturated |
| $C_{16}$ | 2% | saturated |
| $C_{17}$ | 17% | saturated; 48% unsaturated |
| $C_{19}$ | 1% | saturated |

EXAMPLE 3

The procedure is the same as in Example 1, however, 40 kg of molten distearylamine (secondary amine, GENAMIN SH 200 made by Hoechst AG) were added. After removing the main quantity of water below the melting point of distearylamine (about 64° C.), the residual water is distilled off in vacuum with mixing and at temperatures up to 80° C. The uniform mixture so obtained is further processed as in Example 1 into pellets (8–10 mm). The finished product contains 0.2% by weight of water. The hydrogenation activity relative to the tallow fatty acid nitrile of Example 2 corresponds to that of the aqueous, initial catalyst.

EXAMPLE 4

The procedure is the same as in Example 1, except 40 kg of molten glycerin tristearate (EDENOR NHTI made by Henkel) are added. According to the manufacturer, this glycerin tristearate contains 30% tripalmitin $C_{57}H_{110}O_6$. The water is distilled off in the manner of Example 1, below and above the melting point (60° C.) of the glycerin tristearate, and the mixture is pelletized on the cooling belt. The finished product contains only 0.3% by weight water.

Its hydrogenation activity relative to a fatty acid hardening is equivalent to the water-protected initial material.

EXAMPLE 5

The procedure is the same as in Example 1, except for the addition of 40 kg of molten tallow fat amine (hydrogenated tallow fat alkylamine $C_{12}$–$C_{20}$, melting point 50° C., made by Kenobel Co. under tradename AMINE 2 HBG). The further processing into a homogeneous mixture and into pellets is carried out as described in Example 1. The finished product contains only 0.4% by weight water. Its hydrogenation activity relative to the fatty acid nitrile of Example 2 is unchanged compared with the water-protected initial material.

EXAMPLE 6

The procedure is the same as in Example 1, except that 60 kg of molten silicone resin Mk with a melting interval 45°–70° C. (made by Wacker Chemie) are added. The water is distilled off as in Example 1, below and above the melting interval of the silicone resin, and mixture is pelletized (8–10 mm) on the cooling belt. The finished product contains only 0.3% by weight water.

EXAMPLE 7

500 g of a tallow fatty alcohol with molecular weight 260 and an hydroxyl number of 215 are filled into a 1-liter stainless steel pressure vessel with agitator and circulating gas. The average chain distribution of the alcohol is 5% $C_{14}$, 30% $C_{16}$ and 65% $C_{18}$.

After the vessel is flushed with nitrogen, 10 g of catalyst prepared in Example 1 with reference to the nickel content, are added. The stirring apparatus is closed and heated while passing nitrogen through it. Starting at 120° C. and until reaching the temperature of reaction of 200° C., a mixture of ammonia/hydrogen is introduced in a volume ratio of 1:1 for 1.5 hours, then in a ratio of 2:5 for 1 hour and made to circulate at 2 bars. The ammonia water that is formed is removed in a condenser and collected. After 2.5 hours (reaching an iodine number <3), the aminolysis is terminated. After cooling to 100° C. and flushing with nitrogen, the formed amine is isolated.

Analysis shows a total amine yield of 99% of which 89.8% is secondary amine, 5.3% is tertiary amine, 3.9% is primary amine, and 1.0% is non-amine substances.

We claim:

1. An anhydrous, solid Raney-catalyst dispersion in an organic embedding medium selected from a primary, secondary or tertiary amine containing 8–22 carbons, a diamine, a cyclic amine or a solid mixture of one or more thereof, a $C_{16}$–$C_{22}$ aliphatic alcohol, a solid mixture of fatty alcohols containing $C_{16}$–$C_{22}$ aliphatic alcohols, a solid triglyceride, a paraffin wax, a natural or synthetic wax, a silicone resin or an organic polymer, the weight ratio of catalyst-solid to embedding medium being 20–80 and 80–20% by weight, prepared by mixing a Raney-catalyst, in the form of an aqueous slurry, with the embedding medium, by initially introducing the aqueous slurry into a vacuum mixer under an inert gas atmosphere, said embedding medium being in molten or unmolten form, cooling the embedding medium to below the solidification point if the embedding medium is still molten, removing 80 to 90% by weight of the water introduced with the catalyst slurry into the vacuum mixer from the inhomogeneous ternary system of catalyst/water/embedding-medium at temperatures below the melting point of the embedding medium in vacuum, removing the residual water at temperatures above the melting point of the embedding medium in vacuum while continuing the mixing, introducing inert gas to terminate the vacuum and shaping the dispersion into molded bodies of low surface area which are suitable for use in both water-sensitive and water-insensitive systems of reaction.

2. An anhydrous, solid Raney-catalyst dispersion according to claim 1, wherein the embedding medium is tallow $C_{16}$–$C_{18}$ fatty alcohol.

3. An anhydrous, solid Raney-catalyst dispersion according to claim 1, wherein the embedding medium is hard $C_{18}$ paraffin.

4. An anhydrous, solid Raney-catalyst dispersion according to claim 1, wherein the embedding medium is distearylamine.

5. An anhydrous, solid Raney-catalyst dispersion according to claim 1, wherein the embedding medium is glycerin tristearate.

6. An anhydrous, solid Raney-catalyst dispersion according to claim 1, wherein the embedding medium is tallow fat amine.

7. An anhydrous, solid Raney-catalyst dispersion in an organic embedding medium which is a silicone resin, the weight ratio of catalyst-solid to embedding medium being 20–80 and 80–20% by weight, prepared by adding the fusible organic embedding medium in molten or unmolten form to a Raney catalyst in the form of an aqueous slurry while mixing, removing 80 to 90% by weight of the water introduced with the catalyst slurry from the inhomogeneous ternary system of catalyst-/water/embedding-medium under vacuum at temperatures below the melting point of the embedding medium and removing the residual water at temperatures above the melting point of the embedding medium in vacuum while continuing the mixing, and terminating the vacuum to obtain the dispersion.

8. A process for preparing an anhydrous, solid Raney-catalyst dispersion in an organic embedding medium selected from a primary, secondary or tertiary amine containing 8–22 carbons, a diamine, a cyclic amine or a solid mixture of one or more thereof, a $C_{16}$–$C_{22}$ aliphatic alcohol, a solid mixture of fatty alcohols containing $C_{16}$–$C_{22}$ aliphatic alcohols, a solid triglyceride, a paraffin wax, a natural or synthetic wax, a silicone resin or an organic polymer, the weight ratio of catalyst-solid to embedding medium being 20–80 and 80-20% by weight, by mixing a Raney-catalyst, in the form of an aqueous slurry, with the embedding, comprising:

initially introducing the aqueous slurry into a vacuum mixer under an inert gas atmosphere, adding the fusible organic embedding medium in molten or unmolten form with mixing, cooling the embedding medium to below the solidification point if the embedding medium is still molten, removing 80 to 90% by weight of the water introduced with the catalyst slurry into the vacuum mixer from the inhomogeneous ternary system of catalyst/water/embedding-medium at temperatures below the melting point of the embedding medium in vacuum, removing the residual water at temperatures above the melting point of the embedding medium in vacuum while continuing the mixing, introducing inert gas to terminate the vacuum and shaping the dispersion which is still liquid into molded bodies of low surface area.

9. The process of claim 8, wherein the residual water is removed at less than 100° C.

10. The process of claim 8, wherein the dispersion is shaped into pellets by transferring the liquid catalyst dispersion onto a cooled pelletizing system.

11. An anhydrous, solid Raney-catalyst dispersion according to claim 1, which has been dehydrated to less than about 0.99% by weight of water.

* * * * *